(12) United States Patent
Weitzhandler et al.

(10) Patent No.: US 8,665,069 B2
(45) Date of Patent: Mar. 4, 2014

(54) RFID TAG ESPECIALLY FOR USE NEAR CONDUCTIVE OBJECTS

(75) Inventors: Shimon Weitzhandler, RaAnana (IL); Yoav Vilnai, Tel-Aviv (IL); Ilay Levie, Tel-Aviv (IL); Avi Yalon, Ramat-Gan (IL)

(73) Assignee: Petratec International Ltd., Petach-Tikva (IL)

( * ) Notice: Subject to any disclaimer, the term of this patent is extended or adjusted under 35 U.S.C. 154(b) by 597 days.

(21) Appl. No.: 12/738,637

(22) PCT Filed: Oct. 16, 2008

(86) PCT No.: PCT/IB2008/054248
§ 371 (c)(1),
(2), (4) Date: Aug. 25, 2010

(87) PCT Pub. No.: WO2009/050662
PCT Pub. Date: Apr. 23, 2009

(65) Prior Publication Data
US 2010/0308965 A1 Dec. 9, 2010

Related U.S. Application Data

(60) Provisional application No. 60/960,901, filed on Oct. 19, 2007.

(51) Int. Cl.
| | | |
|---|---|---|
| *H04Q 5/22* | (2006.01) |
| *G06F 7/08* | (2006.01) |
| *G06K 7/08* | (2006.01) |
| *H01Q 21/00* | (2006.01) |
| *H01Q 11/02* | (2006.01) |
| *H01Q 1/52* | (2006.01) |

(52) U.S. Cl.
USPC ....... 340/10.1; 340/572.8; 235/381; 235/449; 343/728; 343/732; 343/841; 343/851

(58) Field of Classification Search
None
See application file for complete search history.

(56) References Cited

U.S. PATENT DOCUMENTS

| | | |
|---|---|---|
| 4,469,149 A | 9/1984 | Walkey et al. |
| 5,184,309 A | 2/1993 | Simpson et al. |
| 5,605,182 A | 2/1997 | Oberrecht et al. |

(Continued)

FOREIGN PATENT DOCUMENTS

| | | |
|---|---|---|
| CN | 101036171 | 9/2007 |
| DE | 10241323 | 5/2004 |

(Continued)

OTHER PUBLICATIONS

Official Action Dated Jan. 4, 2012 From the US Patent and Trademark Office Re. U.S. Appl. No. 12/524,189.

(Continued)

*Primary Examiner* — George Bugg
*Assistant Examiner* — Renee Dorsey

(57) ABSTRACT

An RFID tag comprising an antenna assembly, including a shielding layer comprising an electromagnetic shielding material, a radio frequency loop antenna, and a spacer comprising a spacer material having a permittivity less than about 2 interposed between the antenna and the shielding layer is disclosed. Also disclosed are methods of manufacturing such an RFID tag. Also disclosed is the use of such an RFID tag for use in identifying a vehicle, for example in the context of fuel-purchase authorization.

33 Claims, 9 Drawing Sheets

(56) References Cited

U.S. PATENT DOCUMENTS

| | | | |
|---|---|---|---|
| 5,727,608 | A | 3/1998 | Nusbaumer et al. |
| 5,742,229 | A | 4/1998 | Smith |
| 5,858,501 | A | 1/1999 | Malone |
| 5,887,367 | A | 3/1999 | Alvern |
| 5,906,228 | A | 5/1999 | Keller |
| 5,913,180 | A | 6/1999 | Ryan |
| 5,923,572 | A | 7/1999 | Pollock |
| 5,933,788 | A | 8/1999 | Faerber et al. |
| 5,944,069 | A | 8/1999 | Nusbaumer et al. |
| 6,024,142 | A * | 2/2000 | Bates ............................. 141/94 |
| 6,075,707 | A | 6/2000 | Ferguson et al. |
| 6,085,805 | A | 7/2000 | Bates |
| 6,089,284 | A | 7/2000 | Kaehler et al. |
| 6,232,877 | B1 | 5/2001 | Ashwin |
| 6,313,737 | B1 | 11/2001 | Freeze et al. |
| 6,317,098 | B1 | 11/2001 | Andrews et al. |
| 6,338,008 | B1 | 1/2002 | Kohut et al. |
| 6,343,241 | B1 | 1/2002 | Kohut et al. |
| 6,374,870 | B1 | 4/2002 | Müller |
| 6,411,824 | B1 | 6/2002 | Eidson |
| 6,433,742 | B1 | 8/2002 | Crawford |
| 6,560,443 | B1 | 5/2003 | Vaisanen et al. |
| 6,648,032 | B1 | 11/2003 | Kelrich et al. |
| 6,799,614 | B1 | 10/2004 | Smith et al. |
| 6,899,151 | B1 | 5/2005 | Latka et al. |
| 7,034,683 | B2 | 4/2006 | Ghazarian |
| 7,042,357 | B2 | 5/2006 | Girvin et al. |
| 7,119,690 | B2 | 10/2006 | Lerch et al. |
| 7,427,955 | B2 | 9/2008 | Choi et al. |
| 7,474,220 | B2 * | 1/2009 | Choi et al. .................. 340/572.7 |
| 7,614,556 | B2 * | 11/2009 | Overhultz et al. ............ 235/451 |
| 7,839,054 | B2 * | 11/2010 | Cooke et al. .................. 310/328 |
| 8,289,165 | B2 * | 10/2012 | Forster ........................ 340/572.7 |
| 2001/0020198 | A1 * | 9/2001 | Wilson ........................... 700/232 |
| 2002/0167456 | A1 * | 11/2002 | McKinzie, III ............... 343/909 |
| 2003/0146876 | A1 | 8/2003 | Greer et al. |
| 2004/0079799 | A1 | 4/2004 | Symonds et al. |
| 2004/0156339 | A1 | 8/2004 | Urquhart et al. |
| 2004/0203360 | A1 | 10/2004 | Yamagiwa |
| 2004/0221920 | A1 | 11/2004 | Ferguson et al. |
| 2004/0257229 | A1 | 12/2004 | Girvin et al. |
| 2005/0040951 | A1 * | 2/2005 | Zalewski et al. ............ 340/572.1 |
| 2005/0040961 | A1 * | 2/2005 | Tuttle .......................... 340/693.3 |
| 2005/0184155 | A1 * | 8/2005 | Pinkus ........................... 235/449 |
| 2006/0003739 | A1 | 1/2006 | Sasakura et al. |
| 2006/0012479 | A1 | 1/2006 | Ezra |
| 2006/0049249 | A1 | 3/2006 | Sullivan |
| 2006/0145926 | A1 | 7/2006 | Choi et al. |
| 2006/0208899 | A1 * | 9/2006 | Suzuki et al. ............... 340/572.7 |
| 2006/0237528 | A1 | 10/2006 | Bishop et al. |
| 2007/0008121 | A1 * | 1/2007 | Hart .............................. 340/540 |
| 2007/0090954 | A1 * | 4/2007 | Mahaffey ................... 340/572.3 |
| 2007/0250452 | A1 | 10/2007 | Leigh et al. |
| 2007/0257111 | A1 * | 11/2007 | Ortenzi ......................... 235/385 |
| 2008/0018473 | A1 * | 1/2008 | Tsai et al. ................... 340/572.7 |
| 2008/0036608 | A1 * | 2/2008 | Sakama ...................... 340/572.7 |
| 2008/0308628 | A1 * | 12/2008 | Payne et al. .................... 235/381 |
| 2009/0045978 | A1 | 2/2009 | Weitzhandler et al. |
| 2009/0289113 | A1 | 11/2009 | Vilnai et al. |

FOREIGN PATENT DOCUMENTS

| | | |
|---|---|---|
| EP | 0349316 | 1/1992 |
| EP | 0642232 | 3/1995 |
| EP | 0805566 | 11/1997 |
| EP | 0943584 | 9/1999 |
| EP | 1099664 | 5/2001 |
| EP | 1115176 | 7/2001 |
| EP | 0729426 | 4/2003 |
| EP | 00906598 | 3/2005 |
| EP | 1837809 | 7/2006 |
| GB | 2400364 | 10/2004 |
| JP | 2001-101378 | 4/2001 |
| WO | WO 01/03983 | 1/2001 |
| WO | WO 02/087969 | 11/2002 |
| WO | WO 2005/021419 | 3/2005 |
| WO | WO 2005/124581 | 12/2005 |
| WO | WO 2006/044168 | 4/2006 |
| WO | WO 2006/124270 | 11/2006 |
| WO | WO 2007/003293 | 1/2007 |
| WO | WO 2007/049273 | 5/2007 |
| WO | WO 2007/049274 | 5/2007 |
| WO | WO 2008/090539 | 7/2008 |
| WO | WO 2008/096361 | 8/2008 |
| WO | WO 2008/111075 | 9/2008 |
| WO | WO 2009/050662 | 4/2009 |

OTHER PUBLICATIONS

Notice of Allowance Dated Nov. 18, 2010 From the US Patent and Trademark Office Re. U.S. Appl. No. 12/083,979.

Communication Under Rule 71(3) EPC Dated Jan. 27, 2012 From the European Patent Office Re. Application No. 08840101.3.

Response Dated Feb. 14, 2011 to Official Action of Sep. 14, 2010 From the US Patent and Trademark Office Re.: U.S. Appl. No. 12/083,968.

Official Action Dated Feb. 6, 2012 From the US Patent and Trademark Office Re. U.S. Appl. No. 12/530,478.

Examination Report Dated Oct. 21, 2011 From the Instituto Mexicano de la Propriedad Industrial Re. Application No. MX/a/2008/005215 and Its Translation Into English.

Examination Report Dated Feb. 16, 2012 From the Instituto Mexicano de la Propriedad Industrial Re. Application No. MX/a/2009/007966 and Its Summary in English.

Official Action Dated Mar. 12, 2012 From the US Patent and Trademark Office Re.: U.S. Appl. No. 12/083,968.

Response Dated Mar. 22, 2011 to Communication Pursuant to Article 94(3) EPC of Sep. 22, 2010 From the European Patent Office Re. Application No. 08840101.3.

International Preliminary Report on Patentability Dated Apr. 29, 2010 From the International Bureau of WIPO Re.: Application No. PCT/IB2008/054248.

Communication Relating to the Results of the Partial International Search Dated Oct. 20, 2008 From the International Searching Authority Re.: Application No. PCT/IL2008/000349.

International Preliminary Report on Patentability Dated Dec. 11, 2008 From the International Bureau of WIPO Re.: Application No. PCT/IL2006/001222.

International Preliminary Report on Patentability Dated Jan. 22, 2009 From the International Bureau of WIPO Re.: Application No. PCT/IL2006/001221.

International Preliminary Report on Patentability Dated Aug. 6, 2009 From the International Bureau of WIPO Re.: Application No. PCT/IL2007/001575.

International Preliminary Report on Patentability Dated Sep. 24, 2009 From the International Bureau of WIPO Re.: Application No. PCT/IL2008/000349.

International Search Report Dated Mar. 4, 2009 From the International Searching Authority Re.: Application No. PCT/IB2008/054248.

International Search Report Dated Sep. 4, 2008 From the International Searching Authority Re.: Application No. PCT/IL2008/000168.

International Search Report Dated Oct. 6, 2008 From the International Searching Authority Re.: Application No. PCT/IL2008/000349.

International Search Report Dated Jul. 10, 2008 From the International Searching Authority Re.: Application No. PCT/IL2007/001575.

International Search Report Dated Nov. 10, 2008 From the International Searching Authority Re.: Application No. PCT/IL06/01221.

International Search Report Dated Mar. 20, 2008 From the International Searching Authority Re.: Application No. PCT/IL06/01222.

Official Action Dated Jan. 5, 2010 From the US Patent and Trademark Office Re.: U.S. Appl. No. 12/083,968.

Partial International Search Report Dated Jul. 10, 2008 From the International Searching Authority Re.: PCT/IL2008/000349.

(56) References Cited

OTHER PUBLICATIONS

Written Opinion Dated Mar. 4, 2009 From the International Searching Authority Re.: Application No. PCT/IB2008/054248.
Written Opinion Dated Sep. 4, 2008 From the International Searching Authority Re.: Application No. PCT/IL2008/000168.
Written Opinion Dated Oct. 6, 2008 From the International Searching Authority Re.: Application No. PCT/IL2008/000349.
Written Opinion Dated Jul. 10, 2008 From the International Searching Authority Re.: Application No. PCT/IL2007/001575.
Written Opinion Dated Nov. 10, 2008 From the International Searching Authority Re.: Application No. PCT/IL06/01221.
Written Opinion Dated Mar. 20, 2008 From the International Searching Authority Re.: Application No. PCT/IL06/01222.
Official Action Dated May 14, 2012 From the US Patent and Trademark Office Re. U.S. Appl. No. 12/530,478.
Official Action Dated Apr. 27, 2011 From the US Patent and Trademark Office Re.: U.S. Appl. No. 12/083,968.
Office Action Dated Jun. 3, 2012 From the Israel Patent Office Re. Application No. 190933 and Its Translation Into English.
Office Action Dated Jun. 6, 2012 From the Israeli Patent Office Re. Application No. 190934 and Its Translation Into English.
Official Action Dated Jun. 22, 2010 From the US Patent and Trademark Office Re. U.S. Appl. No. 12/083,979.
Notice of Allowance Dated Jun. 22, 2012 From the US Patent and Trademark Office Re.: U.S. Appl. No. 12/083,968.
Response Dated Jul. 6, 2010 to Official Action of Jan. 5, 2010 From the US Patent and Trademark Office Re.: U.S. Appl. No. 12/083,968.
Office Action Dated Jul. 15, 2012 From the Israel Patent Office Re. Application No. 200040 and Its Translation Into English.
Office Action Dated Jul. 20, 2011 From the Israeli Patent Office Re. Application No. 190934 and Its Translation Into English.
Communication Pursuant to Article 94(3) EPC Dated Aug. 12, 2011 From the European Patent Office Re. Application No. 07849601.5.
Official Action Dated Aug. 16, 2012 From the US Patent and Trademark Office Re. U.S. Appl. No. 12/524,189.
Response Dated Aug. 29, 2011 to Official Action of Apr. 27, 2011 From the US Patent and Trademark Office Re.: U.S. Appl. No. 12/083,968.
Translation of Office Action Dated Jul. 23, 2012 From the State Intellectual Property Office of the People's Republic of China Re. Application No. 200880120544.4.
Communication Under Rule 71(3) EPC Dated Sep. 7, 2012 From the European Patent Office Re. Application No. 07849601.5.
Summons to Attend Oral Proceedings Pursuant to Rule 115(1) EPC Dated Sep. 19, 2011 From the European Patent Office Re. Application No. 08840101.3.
Communication Pursuant to Article 94(3) EPC Dated Sep. 22, 2010 From the European Patent Office Re. Application No. 08840101.3.
Notice of Allowance Dated Sep. 20, 2012 From the US Patent and Trademark Office Re. U.S. Appl. No. 12/530,478.
Official Action Dated Sep. 14, 2010 From the US Patent and Trademark Office Re.: U.S. Appl. No. 12/083,968.
Response Dated Oct. 21, 2010 to Official Action of Jun. 22, 2010 From the US Patent and Trademark Office Re. U.S. Appl. No. 12/083,979.
European Search Report and the European Search Opinion Dated Oct. 17, 2012 From the European Patent Office Re. Application No. 12173578.1.
Response Dated Dec. 19, 2011 to Summons to Attend Oral Proceedings Pursuant to Rule 115(1) EPC of Sep. 19, 2011 From the European Patent Office Re. Application No. 08840101.3.
Office Action Dated Dec. 18, 2012 From the Israel Patent Office Re. Application No. 205166 and Its Translation Into English.
Office Action Dated Nov. 12, 2012 From the Israel Patent Office Re. Application No. 200877 and Its Translation Into English.
Official Action Dated Jul. 25, 2013 From the US Patent and Trademark Office Re. U.S. Appl. No. 12/524,189.
Translation of Office Action Dated May 17, 2013 From the State Intellectual Property Office of the People's Republic of China Re. Application No. 200880120544.4.
Examination Report Dated Oct. 9, 2012 From the Instituto Mexican de la Propiedad Industrial Re. Application No. MX/a/2009/007966 and Its Summary in English.
Communication Pursuant to Rules 70(2) and 70a(2) EPC and Reference to Rule 39(1) EPC Dated Nov. 19, 2012 From the European Patent Office Re. Application No. 12173578.1.

* cited by examiner

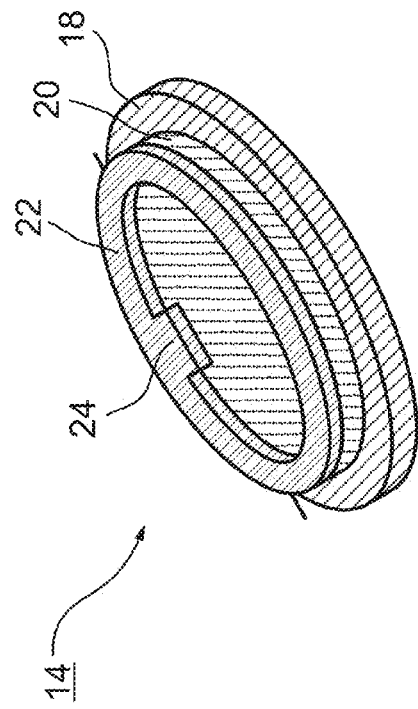
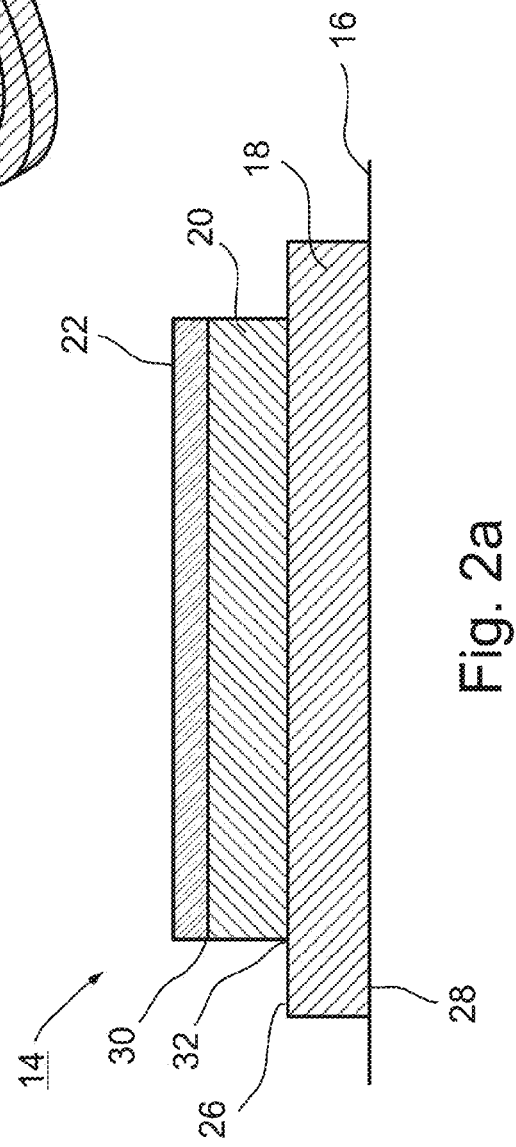

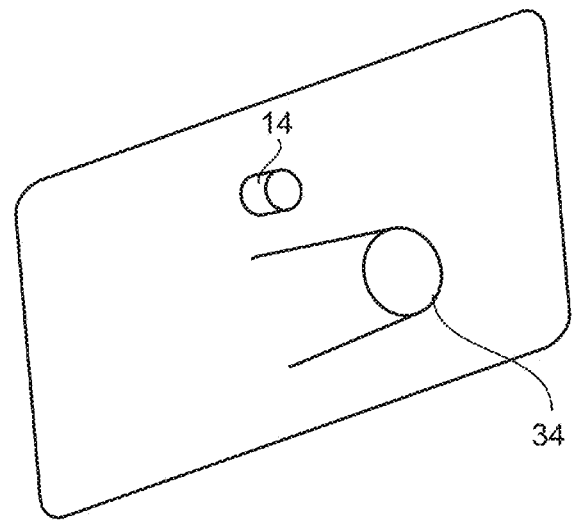
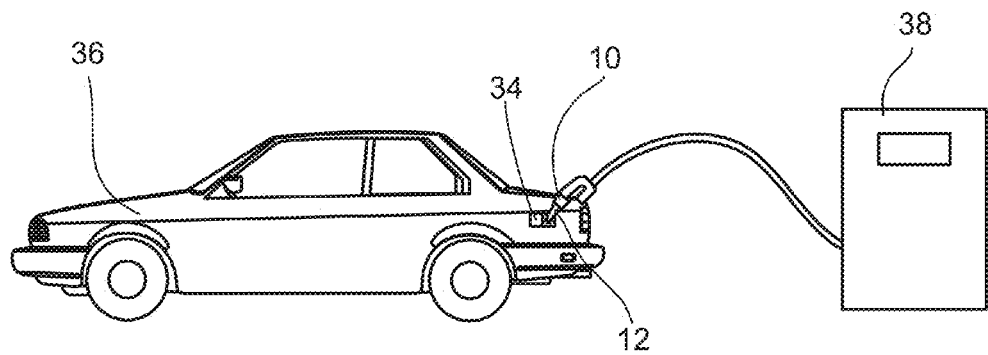
Fig. 3

RFID TAG ESPECIALLY FOR USE NEAR CONDUCTIVE OBJECTS

RELATED APPLICATION

The present application is a National Phase of PCT Patent Application No. PCT/IB2008/054248 having International filing date of Oct. 16, 2008, which claims the benefit under 119(e) of a US provisional application with same inventors and same title, Ser. No. 60/960,901 and filed on Oct. 19, 2007. The disclosure of the above applications are all incorporated herein by reference.

FIELD AND BACKGROUND OF THE INVENTION

The present invention, in some embodiments thereof, relates to the fields of logistics and radio frequency communications and, more particularly, to RFID tags including an antenna that provide reasonable signal strengths when in the proximity of metal objects such as motor vehicles that is useful, for example, for fuel-purchase authorization.

To be successful, a service station generally dispenses fuel to as many vehicles as possible in a given period of time. This is achieved, for example, by providing high speed entrance and egress and many fuel-dispensing locations (i.e., fuel pumps), arranged for high-throughput refueling of many continuously arriving vehicles.

One preferred method for increasing the attractiveness of a service station is through the use of automated payment for fuel. In such methods, a vehicle is equipped with a vehicle identification tag storing data relating to the vehicle identity and a payment method. Each fuel-dispensing location is provided with a vehicle identification tag-reader including a tag reading transceiver provided with a vehicle identification tag reader antenna that is configured to wirelessly read the vehicle identification tag.

In order to reduce fuel theft and in order to reduce interference between identification tag readers, it is useful to limit the range of the wireless communication (as measured between the vehicle identification tag and the vehicle identification tag reader antenna), typically to only a few centimeters. Thus, vehicle identification tags are generally located in proximity of a vehicle refueling port and vehicle identification tag reader antennae are generally secured to a fuel-dispensing nozzle associated with a specific fuel-dispensing location so that the tag reader is able to read the identification tag substantially only when the fuel-dispensing nozzle engages the vehicle refueling port. Generally, associated with the vehicle identification tag reader is a tag reader station communication transmitter, configured to forward information read from a vehicle identification tag to a service station controller.

For example, in the PCT patent applications published as WO 2007/049273 and WO 2007/049274 of the Applicant are taught wireless vehicle identification tag readers as well as systems and methods using the wireless vehicle identification tag readers. As depicted in FIG. 1, a wireless tag reader 10 is configured to be secured to a fuel dispensing nozzle 12 and includes a wireless tag reading transceiver functionally associated with an identification tag reading antenna, a wireless station communication transceiver and an autonomous power source.

When it is desired to purchase fuel using such a wireless system, a fuel dispensing nozzle (such as 12 in FIG. 1) of a fuel dispensing location is placed inside the refueling port of a vehicle, bringing the tag reading antenna of the tag reader (such as contained within the casing of tag reader 10) in wireless communication range with a vehicle identification tag located in proximity of the refueling port. Information (such as vehicle identity, payment means) read by the tag reading transceiver of the tag reader through the tag reading antenna is forwarded to the service station controller by a wireless station communication transceiver (such as contained within the casing of tag reader 10) along with the identity of the fuel-dispensing nozzle with which the tag reader (e.g., tag reader 10) is associated. Based on the applicable rules, the service station controller optionally communicates an authorization signal including if, under what conditions and how much fuel to dispense to the identified vehicle to the service station controller which forwards the authorization signal to the appropriate fuel dispensing location through the existing wired communication.

In order to reduce costs, a wireless tag reader such as 10 is designed to be easy install and remove, allowing simple and cheap hardware upgrading. Due to the simplicity of such wireless tag readers and the ease with which the wireless tag readers may be attached and reattached to a fuel dispensing nozzle, it is often simpler and cheaper (and thus preferred) to discard a wireless tag reader with a spent power source rather than to recharge or replace the power source. It is thus preferred that wireless tag readers, such as 10 be as energy efficient as possible. Energy efficiency allows a given power source to be used for as long as possible before replacement of the entire tag reader.

It is also desirable that the vehicle identification tag to be read by a wireless tag reader be cheap, easy to install and maintenance free. One possibility is to use a vehicle identification tag that is substantially an RFID (radio-frequency identification) tag whether a powered RFID tag or a passive RFID tag.

Preferably, a passive RFID tag which is substantially a passive radio-frequency RFID generally made up of a loop (magnetic dipole antenna) antenna and an electrical circuit is used. The vehicle identification tag is placed in proximity of the fuel inlet port of a vehicle. When the fuel dispensing nozzle (such as 12) is placed in the fuel inlet port, the antenna of the tag reader (such as 10) is close to the antenna of the vehicle identification tag. The tag reader is activated to produce a time-varying magnetic field that passes through the loop of the antenna, inducing an electromotive force which functions as a source of electrical power for the electrical circuit of the tag. The electrical circuit of the tag uses the received power to transmit the required data. Exemplary such devices are described in the PCT patent application published as WO 2007/049274.

It is known that it is challenging to use passive RFID tags of the frequencies suitable for short range transmission (generally, less than about 100 MHz, e.g. 13.56 MHz or 125 KHz) in the proximity of conductive materials such as a metal object (such as a vehicle body) due to the generation of eddy currents in the conductive material which generates a magnetic field opposite to the reader magnetic field, significantly attenuating the magnetic flux through the RFID tag antenna coil, reducing the amount of current induced in the RFID tag antenna coil. It is possible to place the antenna of an RFID tag at a distance from the metal object in order to minimize the negative effects, but such distancing is not practical for use with vehicle identification tags. It is preferred that the vehicle identification tag be unobtrusive and thin so as not to interfere with normal use of the fuel nozzle and to avoid physical damage to the identification tag.

It is known to interpose a sheet of electromagnetic shielding material between an RFID antenna and a conductive material such as a metal so as to reduce the eddy currents and consequently the magnetic field induced in the conductive material (see for example, data sheets for TDK Flexield® (TDK Corporation, Chuo-ku, Tokyo, Japan). The greater the permeability (μ) of the shielding material the greater the reduction of the eddy currents in the conductive material and consequently the stronger the magnetic field produced by the reader that passes through the antenna from the tag. However, it has been found that using an electromagnetic shielding material does not reduce eddy currents sufficiently to allow a desired degree of energy savings when reading an RFID secured in proximity of a refueling port of a motor vehicle.

It would be highly advantageous to have a thin RFID tag that is less susceptible to the effects of a conductive material such as a metal object. For example, it would be highly advantageous to have a passive radio-frequency RFID tag that, when associated with the metal body of a vehicle, provides a reasonable signal with relatively low energy use.

SUMMARY OF THE INVENTION

Embodiments of the present invention successfully addresses at least some of the shortcomings of the prior art by providing an antenna assembly for an RFID tag (powered, but especially a passive RFID tag), an RFID tag comprising such an antenna assembly and a method of making such an antenna assembly, the antenna assembly including a loop antenna located at a distance from a shielding layer comprising an electromagnetic shielding material having a high specific magnetic permeability (μ) and a spacer having a low permittivity (ε) interposed between the antenna and the shielding layer arranged in a manner so when the antenna assembly is in close proximity to a conductive material (e.g., a metal object) attenuation of a magnetic flux through the loop of the antenna caused by eddy currents induced in the conductive material is significantly reduced.

Thus, according to the teachings of the present invention there is provided an RFID tag comprising: a) an antenna assembly, including: i) a shielding layer comprising an electromagnetic shielding material having a first side and a second side, the shielding layer configured to substantially reduce the magnitude of eddy currents induced in a conductive material by a magnetic field passing through the shielding layer; ii) a radio frequency loop antenna with a loop plane located at a distance from the first side of the shielding layer; and iii) a spacer comprising (consisting essentially of and even consisting of) a spacer material interposed between the antenna and the shielding layer, the spacer material having a permittivity (ε) less than about 2; and b) an RFID circuit functionally associated with the antenna. In embodiments the RFID tag is passive.

In embodiments, the distance between the first side of the shielding material and the loop plane is between about 0.5 mm and about 5 mm. In embodiments, the distance is between about 1 mm and about 3 mm, for example about 2 mm.

Generally, the permittivity of the spacer material is as low as possible, in embodiments less than about 1.5, less than about 1.3, less than about 1.1 and even less than about 1.05.

In embodiments, the spacer material comprises (consists essentially of or even, consists of) a foam, such as a polymethacrylimide foam.

In embodiments, the shielding layer is at least about 0.2 mm thick. In embodiments, the shielding layer is no more than about 5 mm thick, no more than about 4 mm thick and even no more than about 3 mm thick.

In embodiments, the electromagnetic shield material comprises ferrite.

In embodiments, the loop plane is substantially parallel to the first surface.

In embodiments, the antenna substantially comprises a loop of wire. In embodiments, the antenna substantially comprises a printed circuit board. In embodiments, the antenna substantially comprises a conductive material (such as a metal) deposited on a surface, for example the surface of the spacer material.

In embodiments, the antenna is surrounded by the spacer material. In embodiments, the antenna is embedded in the spacer. In embodiments, the antenna is deposited on a surface of the spacer material.

In embodiments, the circuit is at least partially contained within the shielding layer. In embodiments, the circuit is at least partially contained within the spacer material.

In embodiments, the RFID tag further comprises at least one non-conducting second spacer layer on the second side of the shielding layer. In such embodiments, when the RFID tag is placed near a conductor such as a metal surface, such as of a motor vehicle, the second spacer layer or layers are interposed between the second side of the shielding layer and the conductor. In such a way, the shielding layer does not contact and is distanced from the conductor. In embodiments, the non-conducting second spacer layers are a total of between about 0.1 mm and about 5 mm thick. In embodiments the thickness is at least 0.5 mm and even at least about 0.9 mm thick. In embodiments, the thickness is no more than about 3 mm and even no more than about 2 mm thick. In embodiments, at least one and preferably all the non-conducting second spacer layers are non-retaining (e.g., neither absorb nor adsorb) of water and/or fuel: retained water or fuel may act as a conductor. Typical suitable materials that are non-retaining of water and/or fuel, include, but are not limited to polyurethane and polyethylene. In embodiments, at least one non-conducting second spacer layer (the terminal such layer) is an adhesive layer. In such embodiments the adhesive layer allows attachment of the thus produced RFID tag to a conductive surface for use.

In embodiments, an RFID tag of the present invention further comprises an adhesive layer functionally associated with the second side of the shielding layer, for example allowing the RFID tag to be secured to a conductive surface, where the antenna is separated from the conductive surface by the shielding layer and by the spacer material.

In embodiments, the antenna, the spacer material and the shielding layer are provided with a hole therethrough (e.g., are loop shaped) allowing the RFID tag to fit over and substantially surround an object, such as a fuel inlet of a vehicle.

In embodiments, the RFID tag further comprises a casing containing the antenna and the spacer material. In embodiments the shielding layer is at least partially contained in the casing. In embodiments, the casing is of a material substantially resistant to gasoline fumes, for example comprises or consists essentially of polyurethane or polycarbonate.

According to the teachings of the present invention there is also provided a method of making a RFID tag (e.g., as described above) comprising: a) providing a sheet of an electromagnetic shielding material having a first side and a second side as a shielding layer, the shielding layer configured to substantially reduce the magnitude of eddy currents induced in a conductive material by a magnetic field passing through the shielding layer; b) providing a solid material having a permittivity (ε) less than about 2 having a top surface and a bottom surface as a spacer; c) associating a radio frequency loop antenna with the top surface of the spacer; d) associating the spacer with the shielding layer so that the bottom surface of the spacer faces the first side of the shielding layer whereby the antenna is maintained at a distance from the shielding layer; and e) functionally associating an RFID circuit with the antenna. Steps a, b, c, d and e are performed in any reasonable order. For example, in embodiments, c precedes d, whereas in other embodiments, d precedes c. In embodiments, the RFID tag is a passive RFID tag.

In embodiments, the functional associating of the RFID circuit with the antenna is such that current produced in the antenna by induction is useable for operation of the circuit.

In embodiments, the distance at which the antenna is maintained from the shielding layer is substantially the thickness of the spacer between the top surface and the bottom surface.

In embodiments, the method further comprises e) adding at least one non-conducting second spacer layer to the second side of the shielding layer. In such embodiments, when the RFID tag is placed near a conductor such as a metal surface, such as of a motor vehicle, the second spacer layer or layers are interposed between the second side of the shielding layer and the conductor. In such a way, the shielding layer does not contact and is distanced from the conductor. In embodiments, the non-conducting second spacer layers are a total of between about 0.1 mm and about 5 mm thick. In embodiments the thickness is at least 0.5 mm and even at least about 0.9 mm thick. In embodiments, the thickness is no more than about 3 mm and even no more than about 2 mm thick. In embodiments, at least one and preferably all the non-conducting second spacer layers are non-retaining (e.g., neither absorb nor adsorb) of water and/or fuel: retained water or fuel may act as a conductor. Typical suitable materials that are non-retaining of water and/or fuel, include, but are not limited to polyurethane and polyethylene. In embodiments, at least one non-conducting second spacer layer (the terminal such layer) is an adhesive layer. In such embodiments the adhesive layer allows attachment of the thus produced RFID tag to a conductive surface for use.

In embodiments, the method further comprises: e) applying an adhesive layer to the second side of the shielding layer. In such embodiments the applied adhesive layer allows attachment of the thus produced RFID tag to a conductive surface for use.

In embodiments, the antenna is a PCB (printed circuit board) antenna. In embodiments, the antenna comprises looped wires. In embodiments, the antenna is surrounded by a resin and/or a polymer, as is known in the art of RFIDs.

In embodiments, associating of the antenna with the spacer comprises bringing the spacer in proximity with the antenna, but not necessarily securing or attaching one to the other. In embodiments, associating the antenna and the spacer comprises placing the antenna and the spacer, at least partially, in a casing so that the casing serves to hold the antenna and the spacer together.

In embodiments, the associating of the antenna with the top surface of the spacer comprises attaching the antenna to the top surface.

In embodiments, the attaching of the antenna to the spacer comprises applying an adhesive between the antenna and the top surface of the spacer to effect the attaching.

In embodiments, associating the antenna with the top surface of the spacer comprises embedding the antenna in the spacer.

In embodiments, associating the antenna with the top surface of the spacer comprises depositing a suitable material (e.g., a metal as a vapor) on the top surface of the spacer so as to constitute the antenna.

In embodiments, associating the antenna with the top surface of the spacer comprises sandwiching the antenna between the spacer and an additional cover layer of a material.

In embodiments, associating of the spacer with the shielding layer comprises bringing the spacer in proximity with the shielding layer, but not necessarily securing or attaching one to the other. In embodiments, associating the shielding layer and the spacer comprises placing the shielding layer and the spacer, at least partially, in a casing so that the casing serves to hold the shielding layer and the spacer together.

In embodiments, associating of the spacer with the shielding layer comprises attaching the spacer to the shielding layer.

In embodiments, the attaching of the spacer to the shielding layer comprises applying an adhesive between the bottom surface of the spacer and the first side of the shielding layer to effect the attaching.

In embodiments, the method further comprises embedding the circuit in the shielding layer.

In embodiments, the method further comprises sandwiching the circuit between the shielding layer and the spacer.

In embodiments, the method further comprises embedding the circuit in the spacer.

In embodiments, the method further comprises attaching the circuit to the top surface of the spacer.

In embodiments, the method further comprises sandwiching the circuit between the spacer and an additional cover layer of a material.

According to the teachings of the present invention there is also provided a method of identifying a vehicle comprising: a) securing an RFID tag as described above to the vehicle where the shielding layer is located between the antenna and the vehicle; b) placing an identification tag reader in proximity of the antenna of the RFID tag; c) activating the identification tag reader to provide power to the RFID circuit through the antenna (e.g., by producing a varying magnetic field so as to induce an electromotive force in the antenna) so that the RFID circuit transmits identification data; and d) receiving the transmitted identification data.

In embodiments, the antenna is located in proximity of a refueling port of the vehicle and the identification tag reader is functionally associated with a fuel dispensing nozzle. In embodiments, the RFID tag is secured to the vehicle so that the refueling port of the vehicle is accessible through the loop of the antenna.

In embodiments, the identification tag reader is mounted on a fuel-dispensing nozzle.

In embodiments, e) based on the received identification data, optionally dispensing fuel to the vehicle.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the invention, suitable methods and materials are described below. In case of conflict, the patent specification, including definitions, will control. In addition, the materials, methods, and examples are illustrative only and not intended to be limiting.

As used herein, the terms "comprising" and "including" or grammatical variants thereof are to be taken as specifying the stated features, integers, steps or components but do not preclude the addition of one or more additional features, integers, steps, components or groups thereof. This term encompasses the terms "consisting of" and "consisting essentially of".

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

BRIEF DESCRIPTION OF THE DRAWINGS

Embodiments of the invention are herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.
In the drawings:

FIGS. 2A and 2B depict an embodiment of a RFID tag of the present invention provided with an embodiment of antenna assembly of the present invention;

FIG. 3 depicts the use of a passive RFID tag of FIGS. 2A and 2B in accordance with the teachings of the present invention;

DESCRIPTION OF EMBODIMENTS

Figure 1:
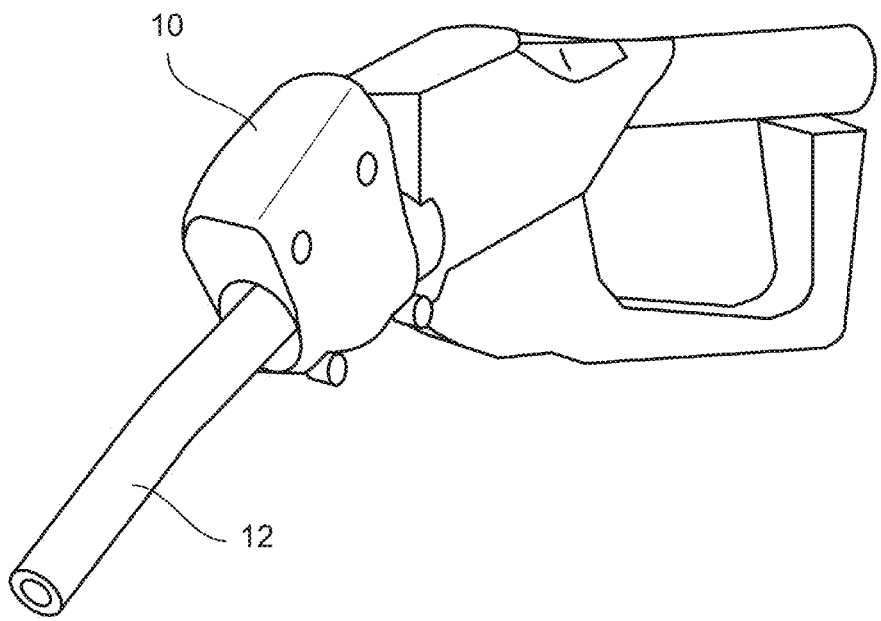
FIG. 1 (prior art) depicts a wireless tag reader secured to a fuel dispensing nozzle.

Embodiments of the present invention relates to antenna assemblies useful for increasing the utility of RFID tags, especially passive RFID tags, in close proximity of a conductive material such as a metal. In a specific implementation, the teachings of the present invention are applied to provide thin passive vehicle identification tags that may be secured in the proximity of a vehicle refueling port and read by a vehicle identification tag reader mounted on a fuel-dispensing nozzle. Embodiments of the present invention allow significant savings by allowing for very cheap identification tags that can be read with relatively little energy expenditure by a vehicle identification tag reader.

The principles and operation of an RFID tag of the present invention provided with an antenna assembly of the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Herein, the term "passive RFID" and variants thereof refers to an RFID tag that stores data (whether read-only or rewritable) devoid of an associated power source. The device receives power from an appropriately configured reader and uses the received power to transmit the data. Typical such devices are passive RFID tags and circuits.

Herein, the term "active RFID" refers to an RFID device including a radio-frequency transmitter (including a transceiver and transponder RFID tag) associated with a power source (such as a battery) that stores data (whether read-only or rewritable) where the device is configured to transmit the data using power from the associated power source.

Herein, the term "fuel dispenser" refers to a device that dispenses fuel, for example to a vehicle, and generally includes a pump, at least one hose and at least one fuel-dispensing nozzle with a fuel dispensing actuator such as a trigger.

As discussed above and in the PCT patent applications published as WO 2007/049273 and WO 2007/049274 of the Applicant, it is highly useful to implement wireless communication during the process of fuel-purchase authorization. One step of such a process where implementation of wireless communication is useful is during identification of a vehicle for deciding whether or not fuel should be dispensed and, if affirmative, how payment should be collected. In the above-referenced PCT patent applications is taught a passive radio-frequency vehicle identification tag that is secured in proximity of the refueling port of a vehicle that is read by an identification tag reader mounted on a fuel-dispensing nozzle (as depicted in FIG. 1) where the identification tag reader is configured to communicate wirelessly both with the vehicle identification tag and with a service station controller. Embodiments of the identification tag reader include a dedicated power supply unit of a limited energy capacity in order to reduce price and simplify installation. It is therefore necessary to reduce the energy use of the identification tag reader by as much as possible to reduce service and maintenance costs.

As discussed above, reading a passive RFID tag includes a step of generating a magnetic field that induces voltage in a loop antenna, which is then used to power the RFID tag circuit. If the loop antenna is close to a conductive material (as occurs when a standard RFID loop antenna embedded in resin is secured to a metal surface of a vehicle) the tag reader necessarily expends a significant amount of energy to overcome the effect of eddy currents induced in the conductive material by the magnetic field so that sufficient energy is induced in the antenna so that the RFID can transmit a signal sufficiently powerful to be read.

It is known to interpose a shielding layer comprising an electromagnetic shield material between an antenna of a passive RFID tag and a conductive material, the shielding layer configured to substantially reduce the magnitude of eddy currents induced in the conductive material by a magnetic field passing through the shielding layer. Since the magnitude of the eddy currents is reduced, a tag reader expends significantly less energy to allow the RFID tag to transmit a signal sufficiently powerful to be read.

However, in many applications, e.g. reading passive RFID vehicle identification tags with the help of vehicle identification tag readers including a limited power source, any savings of energy is important.

Embodiments of the present invention provide an antenna assembly for a passive RFID tags, including a loop antenna (in embodiments, such as known in prior art RFID tags), a shielding layer comprising an electromagnetic shielding material, the shielding layer configured to substantially reduce the magnitude of eddy currents induced in a conductive material by a magnetic field passing therethrough (in embodiments, a shielding layer as known in the art) and a spacing material having a low permittivity (in embodiments, $\epsilon$ less than about 2) arranged in a manner to constitute a spacer so when the antenna assembly is in close proximity to a conductive material (e.g., metal) attenuation of a magnetic flux through the loop of the antenna is significantly reduced. Generally, the antenna is spaced at a distance from the shielding layer and the spacer is interposed therebetween to maintain the distance and to physically support the antenna. In embodiments, the distance between the shielding layer and the antenna is between about 0.5 mm and 5 mm, preferably between 1 mm and 3 mm, for example about 2 mm.

It has been found that all things being equal, the amount of energy expended by a vehicle identification tag reader (such as described in the PCT patent applications published as WO 2007/049273 and WO 2007/049274 of the Applicant) so that a passive RFID tag transmits a signal sufficiently powerful to be read is significantly reduced for a passive RFID tag provided with an antenna shielded in accordance with the teachings of the present invention when compared to a passive RFID tag provided with an antenna shielded only with an electromagnetic shielding material as known in the art.

Although not wishing to be held to any one theory, it is believed that at least one reason for the reduced energy requirements is that contact or close proximity of an antenna with a prior art shielding layer leads to a significant loss of power that is transmitted by the reader into the shielding material. Apparently the interposition of a spacer material that distances the antenna from the shielding layer significantly reduces such losses.

Suitable shielding materials from which to fashion a shielding layer generally have a high specific magnetic permeability ($\mu$) and include shielding materials well-known in the art. An exceptionally suitable type of shielding material with which to implement the teachings of the present invention is a ferrite. Ferrites are well known magnetic materials comprising metallic oxides having a high resistivity and a high magnetic permeability making these exceptionally suitable for use as electromagnetic shielding materials for implementing the teachings of the present invention. Further, ferrites are readily available in the form of ferrite powders suspended in a bonding material (generally an elastomeric bonding material such as rubber) available as thin, flexible and easily worked sheets, with or without adhesive backings, exceptionally useful in implementing the teachings of the present invention.

The exact thickness of the shielding layer used depends on the exact implementation and the magnetic permeability of the shielding material used. That said, generally the shielding layer is at least about 0.2 mm thick, preferably at least about 0.5 mm thick, and even more preferably at least about 1 mm thick. In order to ensure that an RFID tag of the present invention is not too bulky, a shielding layer is generally no more than about 5 mm thick, no more than about 4 mm thick and even no more than about 3 mm thick.

Selection of a suitable shielding material, for example of a suitable ferrite, for implementing the teachings of the present invention, is within the skill of one having ordinary skill in the art and depends in part on the exact implementation. For example, for "low-frequency" RFID implementations (e.g., 125-134 kHz) it is generally preferred to use Mn—Zn ferrites. For "higher-frequency" RFID implementations (e.g., 13.56 MHz) it is generally preferred to use Ni—Zn ferrites.

Examples of available electromagnetic shielding materials suitable for implementing embodiments of the teachings of the present invention include the Flexield® family of shielding materials from the TDK corporation (TDK Corporation, Chuo-ku, Tokyo, Japan) such as IRJ01, IRB02, IVM06, IRL02, IRL03 and especially the high permeability IRL04. Suitable shielding materials are also available, for example, from Emerson & Cuming Microwave Products, N.V. of Westerlo, Belgium (e.g., Eccopad®, Eccoshield® and Eccosorb®), ARC Technologies, Inc. of Amesbury, Mass., USA (e.g., Magram, Wave~X®, such as the Wave~X® WX series), Ferrishield, Inc. of Tampa, Fla., USA (e.g., EA series RFID absorber shielding material such as EA 100), NEC-Tokin of Taihaku-ku, Sendai-shi, Miyagi, Japan (Flex-Suppressor® and Film Impedor®), Crown Ferrite Enterprise Co. of Tao-Yuan, Taiwan (e.g., FAM1, FAM2, FAM3), Fair-Rite Products Corp., Wallkill, N.Y., USA and Coilcraft, Inc., Cary, Ill., USA.

Suitable spacer materials from which to fashion a spacer for implementing the teachings of the present invention generally are solid materials having a permittivity ($\epsilon$) that is as low as possible, but generally less than about 2, less than about 1.5, less than about 1.3, less than about 1.1 and even less than about 1.05. Preferably a suitable spacer material is a solid material that constitutes a spacer layer. In embodiments, the spacer layer is substantially parallel to the first side of the shielding layer. In embodiments, the spacer defines the distance between the antenna and the shielding antenna. Thus in embodiments, the spacer is between about 0.5 mm and 5 mm thick, preferably between 1 mm and 3 mm thick.

A material exceptionally suitable as a spacer material for use in fashioning a spacer of the present invention is polymethacrylimide foam, for example produced by thermal expansion of a co-polymer sheet of methacrylic acid and methacrylonitrile, during which foaming process the copolymer sheet is converted to polymethacrylimide. Suitable polymethacrylamide foams are commercially available as Rohacell® HF (e.g., types 31 ($\epsilon$=1.07), 51 ($\epsilon$=1.07), 71 ($\epsilon$=1.09)) available from Röhm GmbH & Co. KG, Darmstadt, Germany.

Also suitable as spacer material for use in implementing the teachings of the present invention are Eccostock® PP closed cell polyethylene foam ($\epsilon$=1.03-1.06), SH polyurethane foam ($\epsilon$=1.04-1.25), FPH polyurethane foam ($\epsilon$=1.04-1.25), FFP epoxy ($\epsilon$=1.25) and LoK thermoset plastic ($\epsilon$=1.7) all available from Emerson & Cuming Microwave Products, N.V. of Westerlo, Belgium. Also suitable as a spacer material for use in fashioning a spacer of the present invention are foams described in U.S. Pat. No. 4,965,290 ($\epsilon$=1.31-1.76).

Antennae and corresponding RFID tag circuits suitable for implementing the teachings of the present invention are such as known in the art, for example as known in the art of RFID tags. Selection of a specific RFID tag and a corresponding antenna is based on considerations relating to a specific implementation which one skilled in the art is able to make upon perusing the description herein.

Generally, any physical construction of antenna may be suitable, for instance loops of wires, PCBs (populated circuit boards) and conductive materials such as metals deposited on a surface such as the surface of the spacer. Generally, any suitable geometry of loop antenna is suitable for implementing the teachings of the present invention including square loop, rectangular loop, spiral loop, planar loop, stacked loops, multilayer loops and circular loops.

An antenna of an RFID tag of the present invention is generally configured for reception and transmission of radiation having a frequency of less than about 100 MHz, less than about 50 MHz and even less than about 20 MHz. In embodiments, an antenna of an RFID tag of the present invention is configured for reception and transmission of radiation having a standard RFID frequency of 13.56 MHz. In embodiments, an antenna of a RFID tag of the present invention is configured for reception and transmission of radiation having a standard RFID frequency of between about 125 and 134 kHz.

Although the antenna may be oriented in any direction that function, in embodiments the orientation of the antenna is such that the loop plane is parallel to the shielding layer.

In embodiments, the antenna (with or without the associated RFID tag circuit) is encased (in the fashion of prior art RFID circuits) in an antenna casing, for example of resin or polymer, that is associated with the spacer. For example, in embodiments, the antenna is encased in an antenna casing that is attached to a surface of the spacer, for example, with the use of an adhesive.

In embodiments, the antenna (with or without the associated RFID tag circuit) is surrounded by the spacer material. For example, in embodiments, the antenna is sandwiched between the spacer (comprising the spacer material) and an additional layer comprising the spacer material.

In embodiments, the antenna (with or without the associated RFID tag circuit) is embedded in a surface of the spacer.

In embodiments, the antenna is deposited directly on a surface of the spacer.

In embodiments, the RFID circuit is at least partially contained within the spacer.

In embodiments, the RFID circuit is at least partially contained within the shielding layer.

In embodiments, the RFID tag is no more than about 6 mm thick, preferably no more than about 5 mm thick, and even no more than about 4 mm thick. In such embodiments, the shielding layer is generally no more than about 2 mm thick and preferably no more than about 1 mm thick. In such embodiments, the spacer is preferably at least about 1 mm thick and even at least about 2 mm thick but preferably no more than about 5 mm thick.

Embodiments of the present invention are exceptionally useful in the context of vehicle refueling, for example as taught in the PCT patent applications published as WO 2007/049273 and WO 2007/049274 of the Applicant as the RFID tags of the present invention are suitable for securing in the proximity of a refueling port of a vehicle, for example with the use of an adhesive.

As is clear to one skilled in the art, the surfaces in the proximity of vehicular refueling ports are curved for esthetic and technical reasons. Thus, embodiments of the present invention that are configured for attachment in proximity to a vehicle refueling port with the help of adhesive are preferably somewhat flexible. Thus, for such embodiments casings, antennae, shielding layers and spacing materials are chosen having a sufficient flexibility to allow the RFID tag to bend without breaking or other adverse effect when contacted with the curved surfaces typical of the proximity of a vehicular refueling port.

A first embodiment of the present invention, a "coin shaped" RFID tag 14 suitable for use as a vehicle identification tag is depicted in FIGS. 2A and 2B. In FIG. 2A, RFID tag 14 is depicted in cross section secured to a painted metal surface 16 (near the refueling port of a motor vehicle) of a vehicle refueling port. In FIG. 2B, RFID tag 14 is depicted in perspective.

RFID tag 14 comprises four components, a shielding layer 18, a spacer 20, a loop antenna 22 and a passive RFID tag circuit 24.

Shielding layer 18 of RFID tag 14 has a first side 26 and a second side 28 and is substantially a 2 cm diameter disk of 1 mm thick electromagnetic ferrite shielding material (IRL04 Flexield®, TDK Corporation, Chuo-ku, Tokyo, Japan). Shielding layer 18 is secured to painted metal surface 16 by a strong adhesive (e.g., VHB™ by 3M™ corporation, St. Paul, Minn., USA) through second side 28 of shielding layer 18.

Spacer 20 of RFID tag 14 has a top surface 30 and a bottom surface 32 and is substantially is a 1.5 cm diameter disk of 1 mm thick of spacer material, a polymethacrylimide foam (Rohacel HF, Röhm GmbH & Co. KG, Darmstadt, Germany) having a permittivity of 1.07. Bottom surface 32 of spacer 20 is attached to first side 26 of shielding layer 18 with the help of a cyanoacrylate adhesive.

Loop antenna 22 of RFID tag 14 is a 0.3 mm thick multilayer circular coil antenna configured for use at 13.56 MHz and comprises a plurality of windings of 150 micrometer copper.

Passive RFID circuit 24 is functionally associated with loop antenna 22 and is substantially a prior art passive RFID circuit with which one skilled in the art is well acquainted. Suitable such circuits are commercially available, for example from Microchip Technology Inc. (Chandler, Ariz., USA).

Loop antenna 22 and RFID circuit 24 are embedded together in a standard resin casing (of the type known in the field of RFIDs) and attached to top surface 30 of spacer 20 with the help of a cyanoacrylate adhesive.

The use of a RFID tag 14 is discussed with reference to FIG. 3 in the context of a method for vehicle identification for fuel purchase authorization, for example as discussed in the PCT patent applications published as WO 2007/049273 and WO 2007/049274 of the Applicant.

A RFID circuit 24 of a RFID tag 14 is configured to hold a unique identification code associated with a client of a fuel selling organization. RFID tag 14 is secured in the immediate proximity of a refueling port 34 of a vehicle 36 with the use of an adhesive (e.g., VHB™ by 3M™ corporation, St. Paul, Minn., USA as discussed in the PCT patent application published as WO 2007/049274 of the Applicant) so that antenna 22 faces outwards and shielding layer 18 is located between antenna 22 and vehicle 36.

When it is desired to purchase fuel, vehicle 36 is brought to an appropriately configured fuel dispensing location 38 at service station that includes a fuel dispensing nozzle 12 (such as depicted in FIG. 1) on which is mounted a identification tag reader 10 (such as depicted in FIG. 1). Fuel dispensing nozzle 12 is placed inside refueling port 34 of vehicle 36, bringing the tag reading antenna of tag reader 10 in wireless communication range with RFID tag 14 that serves as a vehicle identification tag. Identification tag reader 10 is activated in the usual way, producing a varying magnetic field that induces an electromotive force in antenna 22, thereby powering RFID circuit 24 to transmit an identification code stored in RFID circuit 24. The tag reading transceiver of tag reader 10 receives the transmitted identification code and forwards the identification code to the service station controller along with the identity of fuel-dispensing nozzle 12. Based on the applicable rules, the service station controller optionally communicates an authorization signal including if, under what conditions and how much fuel to dispense to vehicle 36 to the service station controller. The service station controller which forwards the authorization signal to the fuel dispensing location 38 with which fuel-dispensing nozzle 12 is associated. Fuel is the dispensed to vehicle 36.

Figure 4:
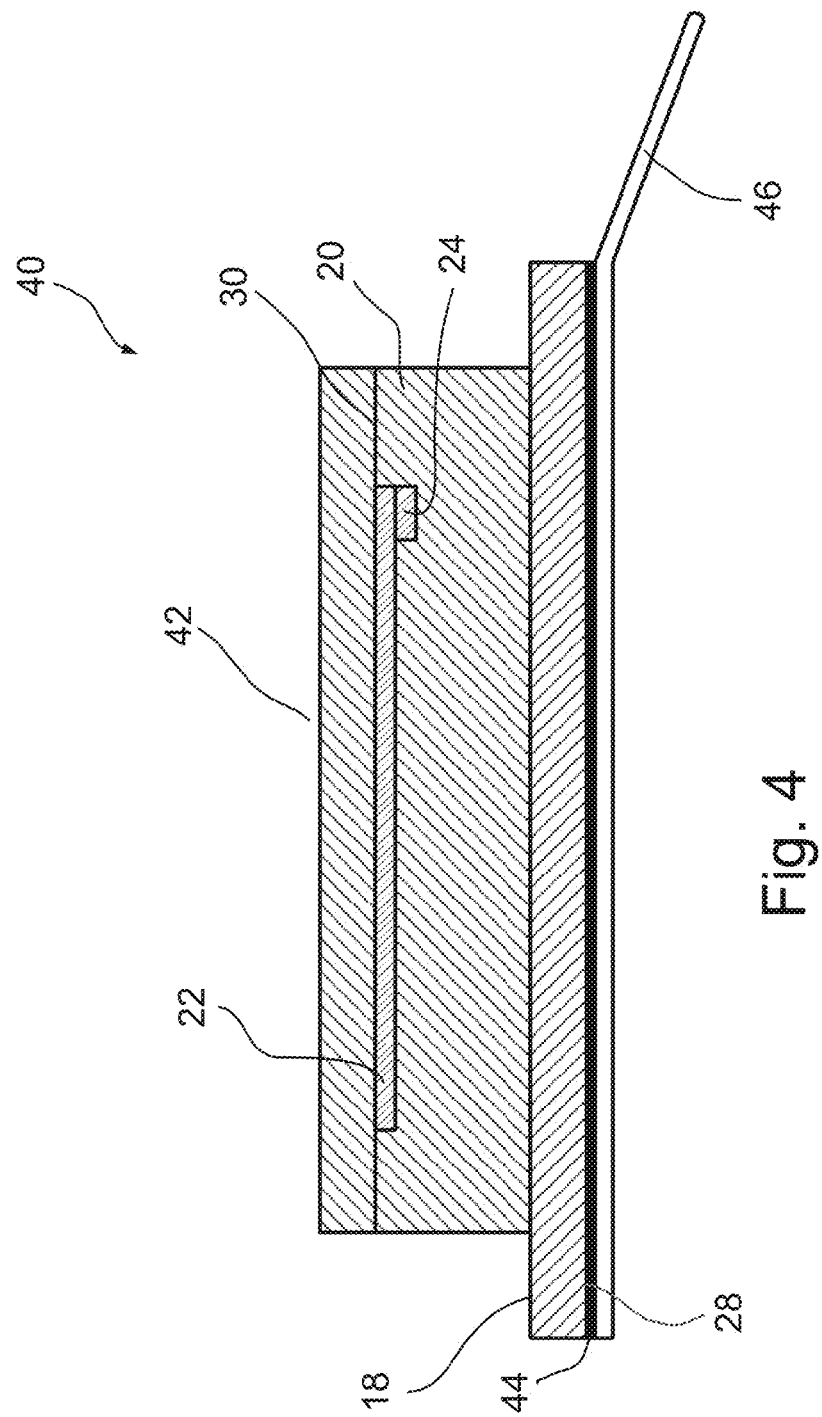
FIG. 4 depicts an embodiment of an RFID tag of the present invention provided with an embodiment of antenna assembly of the present invention.

In FIG. 4 is depicted (in cross section) RFID tag 40, an embodiment of the present invention, where an antenna 22 is surrounded by spacer material having a permittivity (ϵ) less than about 2. Specifically, antenna 22 of RFID 40 is embedded in top surface 30 of spacer 20 made of a 2 mm thick layer of spacer material and held in place by a 0.5 mm thick cover layer 42 of spacer material that is attached to spacer 20 by welding. In such a way, antenna 22 is sandwiched between spacer 20 and cover layer 42. Circuit 24 of RFID tag 40 is embedded within spacer 20 and also sandwiched between spacer 20 and cover layer 42. Additionally, a layer of pressure sensitive adhesive 44 coats a second side 28 of 0.5 mm thick shielding layer 18 of RFID tag 40 and is protected by peel-off sheet 46. For use, peel-off sheet 46 is removed by peeling, exposing adhesive 44. RFID tag 40 is then appropriately secured to a surface, such as a painted metal surface of a vehicle by pressing adhesive 44 against the painted metal surface.

Figure 5A:
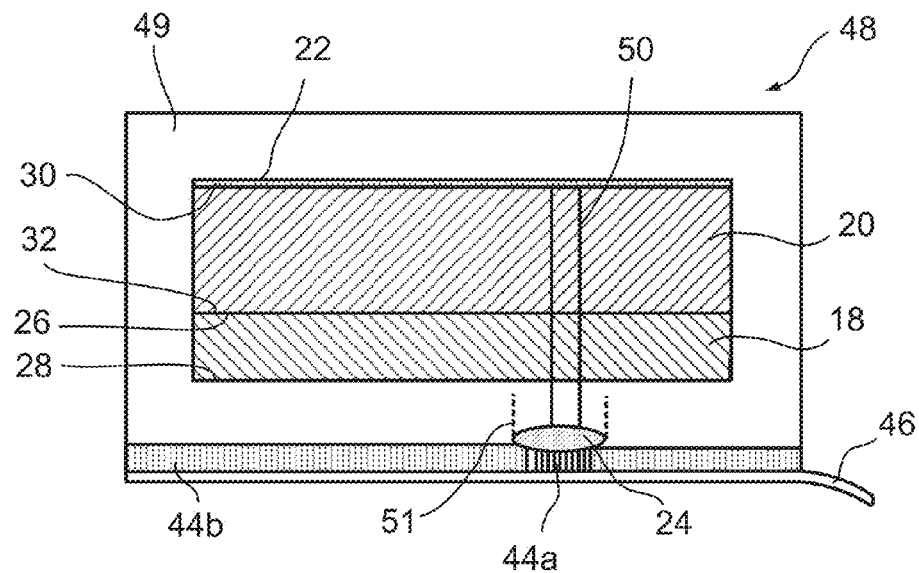
FIG. 5A depicts an embodiment of a RFID tag of the present invention provided with an embodiment of antenna assembly of the present invention.
Figure 5B:
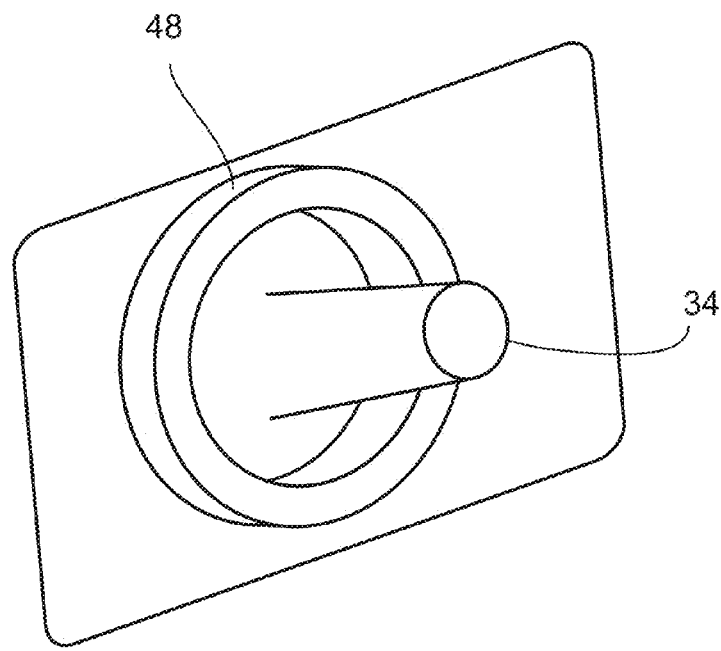
FIG. 5B depicts an RFID tag of FIG. 5A secured in proximity of a refueling port of a vehicle in accordance with the teachings of the present invention.

In FIG. 5A is depicted (in cross section) passive radio frequency RFID tag 48. In FIG. 5B is depicted RFID tag 48 secured in the vicinity of a refueling port 34 of a motor vehicle. In RFID tag 48, an antenna 22 is formed by depositing (e.g., by vapor deposition) an appropriate material (e.g., copper) directly on a top surface 30 of spacer 20, a 2 mm thick ring of Rohacell® HF type 31 with a width of 8 mm and a hole large enough to fit around the refueling port 34.

Shielding layer 18 is a 1 mm thick ring of Flexield® IRL04 associated with spacer 20 by orienting a first side 26 of shielding layer 18 to face a bottom surface 32 of spacer 20. Bottom surface 32 of spacer 20 and first side 26 of shielding layer are in contact but are not secured or otherwise attached. Rather, spacer 20 together with antenna 22 are entirely contained within a ring-shaped flexible polyurethane casing 49 having 1 mm thick walls and a rectangular cross section where the inner cavity defined by the walls is 8 mm wide (radial direction of the ring and substantially parallel to antenna 22) and 3 mm high (perpendicular to antenna 22) so as to completely contain and to snugly hold together shielding layer 18 and spacer 20 within the inner cavity. The polyurethane from which casing 49 is made is non-conducting and non-retaining of fuel and water. The fact that shielding layer 18 and spacer 20 are held together by casing 49 and not otherwise attached or secured makes manufacture and assembly of RFID tag 48 simple and cheap. In addition, the fact that spacer 20 and shielding layer 18 are not mutually secured provides RFID tag 48 with exceptional flexibility: when flexed, for example when secured to a surface of a motor vehicle, little stress or tension is generated as spacer 20 and shielding layer 18 slide past each other. Further, the presence of an adhesive layer between spacer 20 and shielding layer 18 may have unpredictable effects on electrical or magnetic fields passing therethrough, affecting the performance of RFID tag 48.

RFID circuit 24 of RFID tag 48 is partially contained within casing 49 and is in fact embedded therein. Leads 50 protrude from circuit 24 and penetrate through shielding layer 18 and spacer 20 to make functional contact with antenna 22.

On most of the outer surface of casing 49 opposite second side 28 of shielding layer 18 is adhered a tape of relatively weak adhesive 44b (e.g., 0.4 mm thick VHB 4926 acrylic foam tape from 3M, St. Paul, Minn., USA) protected by peel-off sheet 46. Opposite circuit 24 is a small gap in weak adhesive 44b that allows placement of a stronger adhesive 44a for securing RFID tag 48 to a surface. In proximity of the gap for stronger adhesive 44a are also scorings 51 in casing 49.

The 1 mm thick bottom side of casing 49 and the 0.4 mm thick layer of weak adhesive 44b constitute two non-conducting second spacer layers.

For use, a peel-off sheet 46 is peeled-off, exposing weak adhesive 44b. A drop of a stronger adhesive 44a is placed in the gap in adhesive 44b across from RFID circuit 24. Strong adhesive 44a is selected so as to form an adhesion with a painted metal surface that is stronger than the material strength of casing 49 (e.g., epoxy Resin RBC 4503 with hardener A-122, RBC Industries, Inc., Warwick, R.I., USA).

RFID tag 48 is then secured to a surface such as a painted metal surface of a vehicle by pressing against the painted metal surface, see FIG. 5B. The fact that antenna 22, spacer 20 and shielding material 18 are all loop shaped and include a hole, allows RFID tag 48 to be placed over an object such as refueling port 34 so that refueling port 34 is accessible through the hole. Such a configuration allows reading of RFID tag 48 by an identification tag reader (such as 10) secured to a fuel dispensing nozzle (such as 12) engaging refueling port 34, whatever the orientation of the fuel dispensing nozzle, see FIG. 3.

In addition, RFID tag 48 is theft resistant. If a person tries to remove RFID tag 48 from the vehicle, for example with the use of a tool such as a knife, screwdriver or a chisel, the adhesion formed by weak adhesive 44b is broken, but the stronger adhesion formed by strong adhesive 44a remains in place while the tool used pulls casing 49 upwards. Since the adhesion formed by strong adhesive 44a is stronger than the material of casing 49 and due to the structural weakness caused by scoring 51, casing 49 is pulled upwards and is broken, leaving circuit 24 attached to the vehicle and RFID tag 48 is rendered useless.

Figure 6:
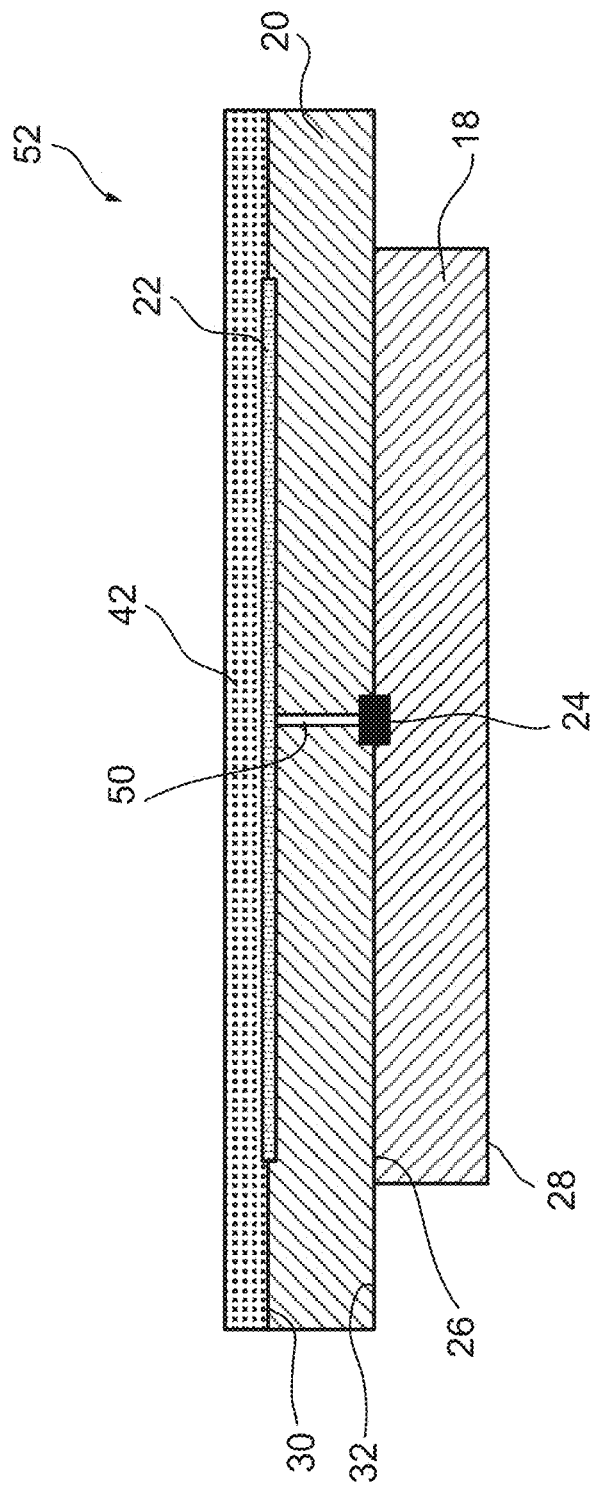
FIG. 6 depicts an embodiment of an RFID tag of the present invention provided with an embodiment of antenna assembly of the present invention.

In FIG. 6 is depicted (in cross section) RFID tag 52, an embodiment of the present invention where circuit 24 is embedded in bottom surface 32 of spacer 20 and in first side 26 of shielding layer 18 so as to be sandwiched between spacer 20 and shielding layer 18 with an adhesive (e.g., cyanoacrylate) and is configured to be secured to a surface with the help of a relatively strong adhesive. A cover layer 42, is fashioned from a relatively hard protective material, a hard resin attached to top surface 30 of spacer 20. Like RFID tag 48 depicted in FIG. 5, RFID tag 52 is configured to be theft resistant. Due to the fact that RFID tag 52 is thin, RFID tag 52 is not affected by normal use. However, when for example, a tool such as a screwdriver is used in an attempt to pry RFID tag 52 from a vehicle to which attached, the screwdriver encounters the overhang of spacer 20, breaking the adhesion between spacer 20 and shielding layer 18 at the interface between bottom surface 32 of spacer 20 and first side 26 of shielding layer 18 which disconnects leads 50 rendering RFID 52 useless.

In non-depicted embodiments similar to RFID tag 52 depicted in FIG. 6, an RFOD circuit 24 is embedded only in a spacer 20 or only in a shielding layer 18.

The present invention also provides for methods of making an RFID tag such as described above. In any logical and useful order, the method comprises:

a) Providing a sheet of an electromagnetic shielding material having a first side and a second side as a shielding layer, the shielding layer configured to substantially reduce the magnitude of eddy currents induced in a conductive material by a magnetic field passing through the shielding layer. Exemplary materials and dimensions of such a shielding layer are as described above.

b) Providing a solid material having a permittivity ($\epsilon$) less than about 2 having a top surface and a bottom surface as a spacer. Exemplary materials and dimensions of such a spacer are as described above.

c) Associating a radio frequency loop antenna with the top surface of the spacer. One skilled in the art is able, upon perusal of the description herein, to select appropriate materials, dimensions and parameters of a suitable loop antenna. In embodiments, the antenna is surrounded (e.g., encased) by a resin and/or a polymer in the manner with which one skilled in the art is familiar and the antenna is associated with the top surface of the spacer together with the surrounding material. In embodiments, the antenna is associated to the top surface of the spacer by attaching the antenna, for example by applying an adhesive between the antenna and the top surface of the spacer to effect the attaching. In embodiments, associating the antenna with the top surface of the spacer comprises embedding the antenna in the spacer. In embodiments, associating the antenna with the top surface of the spacer comprises depositing a suitable material on the top surface of the spacer so as to constitute the antenna, for example vapor deposition of copper. In embodiments, associating the antenna with the top surface of the spacer comprises sandwiching the antenna between the spacer and an additional cover layer of a material, for example a low permittivity material (e.g., the same material from which the spacer is made) or a hard and/or resilient protective material. That said, in embodiments, associating the antenna with the spacer comprises bringing the spacer in proximity with the antenna, but not necessarily securing or attaching one to the other. In embodiments, associating the antenna and the spacer comprises placing the antenna and the spacer, at least partially, in a casing so that the casing serves to hold the antenna and the spacer together.

d) Associating the spacer with the shielding layer so that the bottom surface of the spacer faces the first side of the shielding layer whereby the antenna is maintained at a distance from the shielding layer, where preferred such distances are as described above. In embodiments, the distance at which the antenna is maintained from the shielding layer is substantially the thickness of the spacer as measured between the top surface and the bottom surface. In embodiments, associating of the spacer with the shielding layer comprises attaching the spacer to the shielding layer. In embodiments, attaching of the spacer to the shielding layer comprises applying an adhesive between the bottom surface of the spacer and the first side of the shielding layer to effect the attaching. That said, in embodiments, associating the shielding layer with the spacer comprises bringing the spacer in proximity with the shielding layer, but not necessarily securing or attaching one to the other. In embodiments, associating the shielding layer and the spacer comprises placing the shielding layer and the spacer, at least partially, in a casing so that the casing serves to hold the shielding layer and the spacer together.

e) Functionally associating a passive radio frequency circuit with the antenna, preferably so that current produced in the antenna by induction is useable for operation of the circuit.

In embodiments, the circuit is at least partially embedded in the shielding layer. In embodiments, the circuit is sandwiched between the shielding layer and the spacer. In embodiments, the circuit is embedded in the spacer. In embodiments, the circuit is attached to the top surface of the spacer. In embodiments, the circuit is sandwiched between the spacer and an additional cover layer of a material.

In embodiments, the method further comprises applying an adhesive layer to the second side of the shielding layer. In embodiments, such an adhesive is useful in attaching the RFID tag to a surface for use.

EXPERIMENTAL

The efficacy of an embodiment of the present invention was studied by simulating the coupling of an RFID tag of the present invention with a tag reader under conditions similar to those encountered in the field of vehicular refueling.

Calculation

Figure 7A:
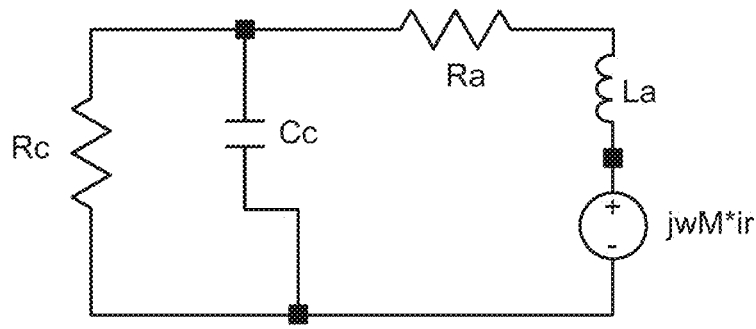
FIGS. 7A and 7B depict model circuits used in simulating embodiments of the teachings of the present invention.

A tag-equivalent circuit is depicted in FIG. 7A, where La is tag-antenna inductance, Ra is tag-antenna loss, Cc is chip internal capacitance, Rc is a chip power consumption equivalent resistor and jwM*Ir is the voltage induced in the tag antenna by current in a reader antenna, where w is inductance and M is the tag antenna/tag reader antenna mutual inductance.

Figure 7B:
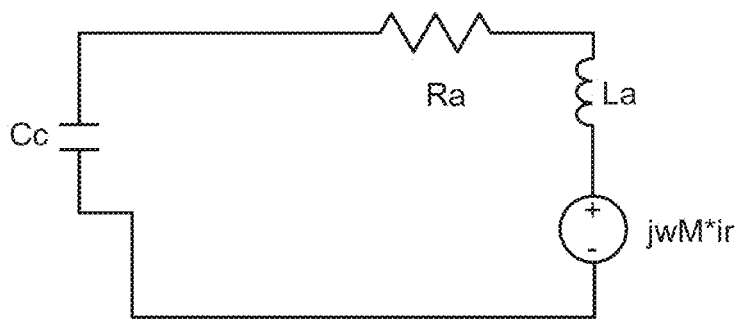

Chip power consumption (Rc) and internal capacitance (Cc) are determined by the chip architecture so that antenna geometry only influences La, M and Ra. A tag-equivalent circuit to study antenna loss while neglecting chip loss is depicted in FIG. 7B.

La is changed so the chip will be at resonance so as to generate maximum voltage on Cc, the tag terminals. As this is a simple resonance circuit the voltage in the tag at resonance will be Q times the induced voltage, equation 1:

$$V_C = \frac{j\omega M \cdot i_r}{R_a} \cdot \frac{1}{j\omega C_C} = j\omega M \cdot i_r \cdot Q \tag{1}$$

To produce resonance at a specific frequency, $w_0$, the inductance must be, equation 2:

$$L_a = \frac{1}{\omega_0^2 C_C} \tag{2}$$

From equation 1 is seen that to increase voltage across the chip terminals, one must increase the tag Q and increase the mutual inductance M between the tag and reader antenna.

From equation 2 is seen that La (tag inductance) cannot be changed and is constant for a given chip. As both Q and M are values that are dependent on La, equation 1 is rewritten so as to allow the study the effects of the variables while keeping La constant.

It is well known that the mutual coupling is related to the coupling factor k, equation 3:

$$M = k \cdot \sqrt{L_a \cdot L_r} \tag{3}$$

where La is the tag antenna inductance and Lr is the reader antenna inductance. Both are taken as constants.

The quality factor of the tag (as any series resonance circuit) is defined as, equation 4:

$$Q = \frac{j\omega La}{Ra} \tag{4}$$

= (energy stored at resonator)/(average power loss)

The quality factor is the ratio between the resonator ability to store energy and the power loss in the resonator. A resonator that has the ability to store a high value of energy will have low loss, will produce a large voltage and a signal will not decay easily.

As La is constant for a given chip, so is the maximum energy storable therein. Thus, the only way to increase the tag Q is to reduce antenna losses as much as possible.

By combining equations 1, 3 and 4 it is possible to see how the design parameters k and Ra effect the voltage induced in the tag chip, equation 5:

$$V_C = \frac{j\omega k \cdot i_r}{R_a} j\omega L_a \sqrt{L_a \cdot L_r} = \frac{k}{R_a} \cdot Const \qquad (5)$$

As all other parameters are not dependent on tag antenna design, the only design parameters affected by antenna geometry are k and Ra. The ration between the coupling factor and the antenna loss is defined as the tag "coupling quality", equation 6:

$$Cq \equiv \frac{k}{R_a} \qquad (6)$$

= {Tag ability to capture reader magnetic flux}/{Tag loss}

Coupling quality Cq resembles the definition of Quality factor in a resonator but as the energy storage ability of tags with the same chip is constant, it is not important when comparing tags with the same chips and different antennae.

A magnetic material such as shielding layer 16 in close proximity to a tag antenna can affect antenna performance in several ways:

(1) Increase the tag ability to store magnetic energy. Magnetic energy is stored inside the magnetic material which increase the tag Q, tag antenna inductance and voltage across the tag chip;

(2) Direct the magnetic field flux produce by the reader antenna to the direction of the tag antenna, thus increasing the tag and reader coupling factor k;

(3) Reduce parasitic induced currents on metals (such as conductor 16) close to the tag antenna and in this way increases the coupling between the reader and tag antennas;

(4) Magnetic materials also have large loss at high frequencies so a magnetic material close to a tag antenna can increase its loss, reducing Q and consequently performance.

The tag coupling quality factor, as defined above, indicates how well the magnetic material does (2), (3) and (4) and ignores the effect the magnetic material has on energy storage ability (1).

EXPERIMENTAL DESIGN

Figure 7C:
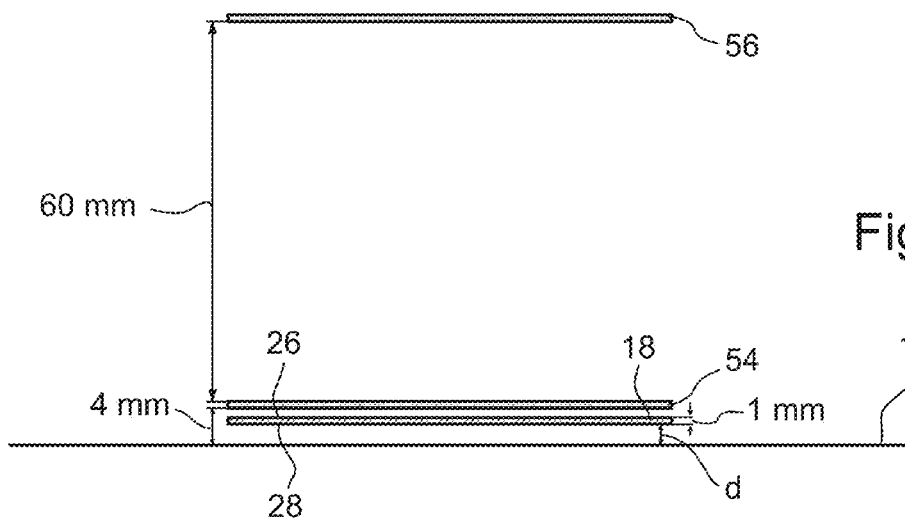
FIG. 7C depicts a simulated RFID tag and reader studied for understanding embodiments of the teachings of the present invention.

An inductive-coupling RFID tag operating at a frequency of 13.56 MHz having a single winding of 73 mm by 73 mm square similar to a tag 48 depicted in FIGS. 5A and 5B was simulated as depicted in FIG. 7C. In the simulation, a planar loop RFID tag antenna 54 was suspended 4 mm from and parallel to an infinitely large conductor 16 in a vacuum having a permittivity ($\epsilon$) of 1. A shielding layer 18 comprising a 1 mm thick ferrite square-ring loop having 9 mm width and outer dimensions of 77 mm×77 mm and a magnetic permeability ($\mu$) of 20 (similar to that of material K4E by NEC-Tokin of Taihaku-ku, Sendai-shi, Miyagi, Japan) was interposed between conductor 16 and antenna 54.

A tag reader antenna 56 having the same physical dimensions as RFID tag antenna 54 was placed 60 mm from RFID tag antenna 54, a typical distance between a fuel-dispensing nozzle mounted tag reader antenna (such as found in tag reader 10 of FIG. 1) and an RFID tag antenna mounted near a vehicle refueling port.

The coupling between tag reader antenna 56 and RFID tag antenna 54 was calculated (the Z-matrix extracted) as a function of a varying distance between shielding layer 18 and RFID tag antenna 54 and expressed in terms of "Tag Coupling Quality" (see below).

Specifically, the distance d of shielding layer 18 from conductor 16 was varied from being not present (designated as d=−1) and from d=0 where second side 28 of shielding layer 18 contacted conductor 16 (and thus first side 26 being 3 mm from antenna 54) to d=3 mm at which first side 26 of shielding layer 18 contacted RFID tag antenna 54.

Results

Figure 7D:
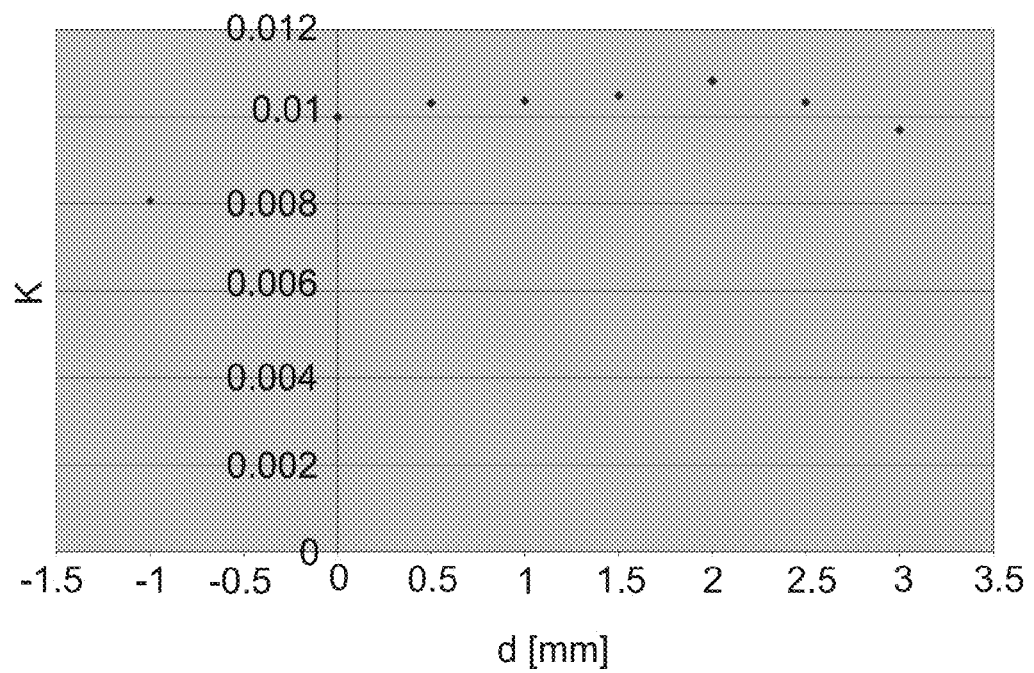
FIGS. 7D, 7E and 7F are graphs showing the results of simulations performed to study embodiments of the teachings of the present invention.

The effect of the distance d in mm on k, the coupling factor is depicted in FIG. 7D. It is seen that compared to no shielding layer (point at d=−1) there is a sharp increase of k when a shielding layer 18 is present (points d=0 to d=3). There is a gradual increase of k as the shielding layer 18 approaches antenna 54 until a maximum k is achieved at d=2 mm (first surface 26 is 1 mm from antenna 54). As shielding layer 18 is brought even closer, k decreases.

Figure 7E:
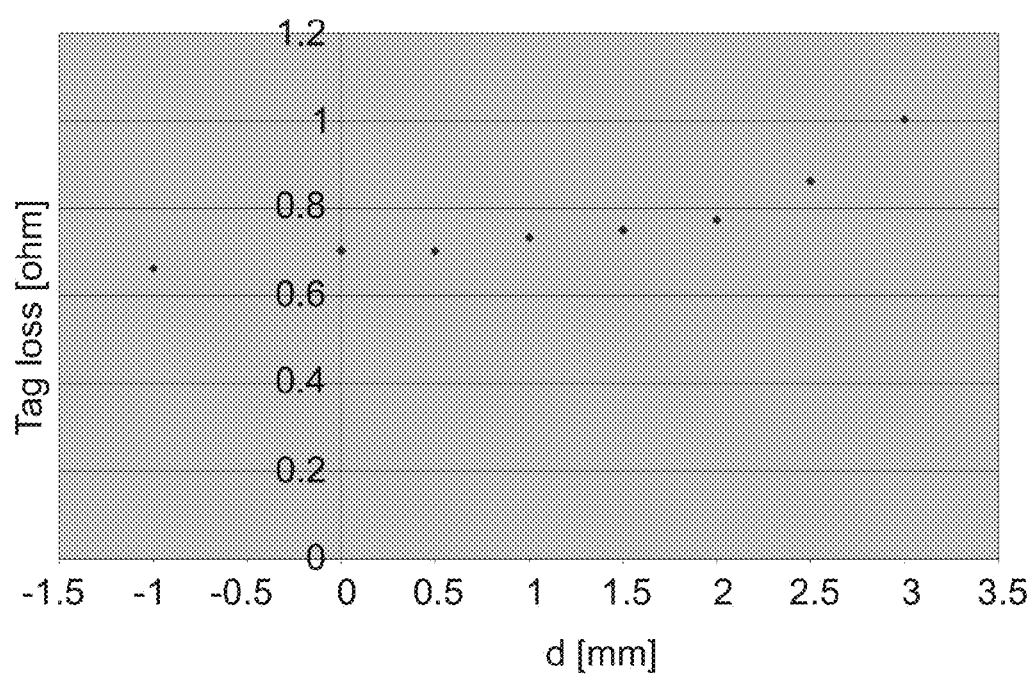

The effect of the distance d in mm on Ra, the tag loss is depicted in FIG. 7E. It is seen that tag loss increases with the presence of a magnetic material and as the magnetic material approaches contact with the antenna.

Figure 7F:
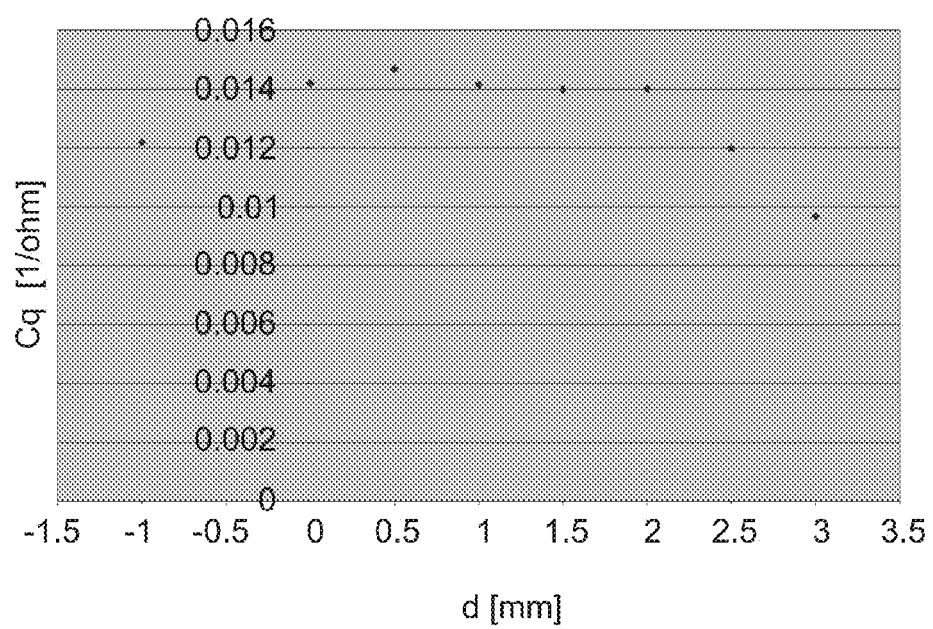

The effect of the distance d in mm on Cq, the Coupling quality is depicted in FIG. 7F. It is seen that compared to no shielding layer (point at d=−1) there is a sharp increase of k when a shielding layer 18 is present close to conductor 16 and distant from antenna 54 (points d=0 to d=2, peaking at d=0.5). As shielding layer 18 is brought even closer, k sharply decreases (points d=2.5 and 3).

CONCLUSIONS

From FIGS. 7D, 7E and 7F it is seen that it is important to interpose a magnetic shielding material between an RFID antenna and a conductor, but the shielding material should not be too close to the antenna. The interposition of a low permittivity spacer material in accordance with the teachings of the present invention significantly improves antenna performance. Such improved performance allows the use of less energy by the tag reader to induce sufficient potential in the tag antenna to allow the tag being read to transmit a sufficiently strong signal.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An RFID tag comprising:
   a) an antenna assembly, including:
      i) a shielding layer comprising an electromagnetic shielding material having a first side and a second side, said shielding layer configured to substantially reduce the magnitude of eddy currents induced in a conductive material by a magnetic field passing through said shielding layer;
      ii) a radio frequency loop antenna with a loop plane located at a distance from said first side of said shielding layer; and
      iii) a spacer comprising a spacer material interposed between said antenna and said shielding layer; and
   b) an RFID circuit functionally associated with said antenna;
   wherein said antenna, said spacer material, and said shielding layer are provided with a hole therethrough large enough to allow the RFID tag to fit around a fuel inlet or refueling port of a vehicle.

2. The RFID tag of claim 1, wherein said distance is between 0.5 mm and 5 mm.

3. The RFID tag of claim 1, wherein permittivity of said spacer material is less than 2.

4. The RFID tag of claim 1, wherein permittivity of said spacer material is less than 1.3.

5. The RFID tag of claim 1, wherein permittivity of said spacer material is less than 1.1.

6. The RFID tag of claim 1, wherein said spacer material comprises polymethacrylimide foam.

7. The RFID tag of claim 1, wherein said shielding layer is at least 0.2 mm thick.

8. The RFID tag of claim 1, wherein said shielding layer is no more than 5 mm thick.

9. The RFID tag of claim 1, wherein said electromagnetic shield material comprises ferrite.

10. The RFID tag of claim 1, wherein said antenna is encased in an antenna casing associated with said spacer material.

11. The RFID tag of claim 1, wherein said antenna is sandwiched between said spacer material and a cover layer of spacer material.

12. The RFID tag of claim 1, wherein said antenna is deposited on a surface of said spacer material.

13. The RFID tag of claim 1, wherein said circuit is at least partially contained within said shielding layer.

14. The RFID tag of claim 1, wherein said circuit is at least partially contained within said spacer material.

15. The RFID tag of claim 1, further comprising at least one non-conducting second spacer layer on said second side of said shielding layer.

16. The RFID tag of claim 15, wherein at least one said non-conducting second spacer layer is impervious to water and fuel.

17. The RFID tag of claim 15, wherein said second spacer layer is between 0.1 mm and 5 mm thick.

18. The RFID tag of claim 15, wherein at least one non-conducting second spacer layer is an adhesive layer.

19. The RFID tag of claim 1, further comprising a casing substantially containing said antenna and said spacer.

20. The RFID tag of claim 19, wherein said shielding layer is at least partially contained within said casing.

21. The RFID tag of claim 1, wherein said antenna, said spacer material and said shielding layer are configured for the RFID tag to be secured in proximity of said fuel inlet or refueling port of said vehicle.

22. The RFID tag of claim 1, wherein said antenna and said spacer are devoid of direct attachment.

23. The RFID tag of claim 1, wherein said shielding layer and said spacer are devoid of direct attachment.

24. A method of identifying a vehicle, the method comprising:
   a) providing an RFID tag comprising:
      a) an antenna assembly, including:
         i) a shielding layer comprising an electromagnetic shielding material having a first side and a second side, said shielding layer configured to substantially reduce the magnitude of eddy currents induced in a conductive material by a magnetic field passing through said shielding layer;
         ii) a radio frequency loop antenna with a loop plane located at a distance from said first side of said shielding layer; and
         iii) a spacer comprising a spacer material interposed between said antenna and said shielding layer; and
      b) an RFID circuit functionally associated with said antenna;
      wherein said antenna, said spacer material, and said shielding layer are provided with a hole therethrough large enough to allow said RFID tag to fit around a fuel inlet or refueling port of the vehicle;
   b) securing over said fuel inlet or refueling port of the vehicle said RFID tag so that said shielding layer is located between said antenna and the vehicle, and so that said fuel inlet or refueling port is accessible through said hole;
   c) placing an identification tag reader in proximity of said antenna;
   d) activating said identification tag reader to provide power to said RFID circuit through said antenna so that said RFID circuit transmits identification data; and
   e) receiving said transmitted identification data.

25. The method of claim 24, wherein said antenna is located in proximity of said fuel inlet or refueling port of the vehicle and said identification tag reader is functionally associated with a fuel dispensing nozzle.

26. The method of claim 25, wherein said RFID tag is secured to the vehicle so that said fuel inlet or refueling port is accessible through a loop of said antenna.

27. The method of claim 25, wherein said identification tag reader is mounted on said fuel-dispensing nozzle.

28. The method of claim 24, further comprising:
   e) based on said received identification data, optionally dispensing fuel to the vehicle.

29. The RFID tag of claim 1,
   wherein said shielding layer and said spacer limit the range of communication of said antenna to a distance of 60 mm between a fuel-dispensing nozzle and said vehicle fuel inlet or refueling port.

30. The RFID tag according to claim 29, wherein said spacer material comprises polymethacrylimide foam.

31. The RFID tag of claim 1, further comprising a flexible casing substantially containing said antenna and said spacer, and said shielding layer and acting as a spacing layer between said shielding layer and said conductive material, and wherein said spacer and said shielding layer are not secured or attached to each other.

32. The RFID tag of claim 1, wherein said antenna forms a loop around said hole.

33. The RFID tag of claim 1, wherein said RFID circuit is on an opposite side of said shielding layer from said antenna, and wherein said shielding layer is secured to said conductive surface by a strong adhesive.

* * * * *